United States Patent Office 3,839,422
Patented Oct. 1, 1974

3,839,422
TRANQUILIZERS
Herbert L. Wehrmeister, Terre Haute, Ind., assignor to Commercial Solvents Corporation
No Drawing. Filed Dec. 4, 1972, Ser. No. 312,089
Int. Cl. C07c *119/10*
U.S. Cl. 260—490   11 Claims

ABSTRACT OF THE DISCLOSURE

Compounds corresponding to the formula

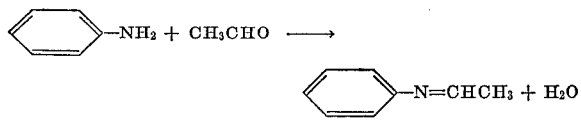

where R is hydrogen, chlorine or methoxy; $R^1$ and $R^2$ are hydrogen or methyl and can be the same or different; and $R^3$ can be methyl or ethyl. The compounds have utility as tranquilizing agents for animals.

SUMMARY OF THE INVENTION

This invention relates to compounds known as Schiff bases. In a particular aspect this invention relates to Schiff bases useful as tranquilizing agents for animals.

Schiff bases have long been known. Previously they have been prepared by reacting an aldehyde with a primary amine:

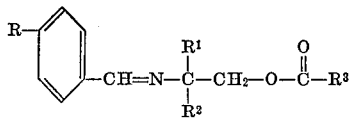

It is an object of this invention to provide new compositions of matter.

It is another object of this invention to provide a new process for the preparation of Schiff bases.

It is yet another object of this invention to provide tranquilizers for calming animals.

Other objects of this invention will be apparent to those skilled in the art from the disclosure herein.

It has been discovered that compounds corresponding to the formula

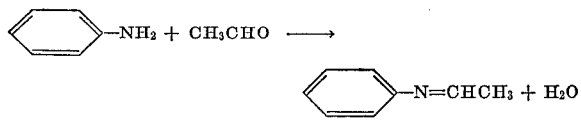

where R is hydrogen, chlorine or methoxy, $R^1$ and $R^2$ are hydrogen or methyl and can be the same or different, and $R^3$ can be methyl or ethyl, have a calming or tranquilizing effect on animals when administered orally or intravenously. The compounds are prepared by reacting an aldehyde corresponding to the formula

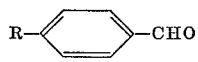

with an oxazoline corresponding to the formula

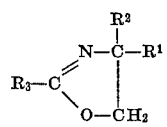

preferably but not necessarily in the presence of a trace of an acid catalyst, at a temperature of from about room temperature to about 160°.

DETAILED DISCUSSION

It was very surprising to discover that aldehydes react with a 2-alkyl-2-oxazoline to produce a Schiff base because previously the prior art had taught that the aldehyde would condense with the α-carbon attached to the carbon atom in the 2-position and form an unsaturated linkage therewith (Wehrmeister, U.S. Pat. 3,466,308).

The compounds of this invention are prepared by reacting the aldehyde and the oxazoline in about a 1:1 mole ratio, preferably in the presence of an inert solvent, e.g. xylene. Reaction times of two days at 140–160° or up to twelve days or more at room temperature are required for good yields.

Suitable acid catalysts include organic and inorganic catalysts and include inorganic mineral acids such as sulphuric, hydrochloric and phosphoric acids; organic carboxylic and sulphonic acids, such as formic, benzene sulphonic, p-xylenesulphonic, p-toluenesulphonic, naphthalenesulphonic acids and trifluoroacetic acid. Trifluoroacetic acid has been found to be advantageous as a catalyst. The amount of catalyst employed will generally range from about 0.001 to 10%, preferably from about 0.05 to about 1.0% by weight of the reactants, although more or less can be employed. A catalyst is not necessary, but is preferred because it shortens the reaction time.

The aldehydes and oxazolines corresponding to the foregoing formula which are useful in the practice of this invention are commercially available and the usual commercial materials are suitable.

The compounds of this invention have demonstrated pharmacological activity. In particular they have been found to exert a depressant action on the central nervous system when tested under standard and accepted pharmacological procedures in laboratory animals, such as mice. They are, therefore, deemed to possess utility in experimental and comparative pharmacology and are of value to treat conditions in animals, such as mice, rats and the like, responsive to treatment with central nervous system depressant agents, such as the need to induce a calming effect.

These compounds are weakly alkaline and readily form salts with most acids. Many of these salts are water-soluble and advantageously can be used for administering these compounds. The invention therefore contemplates the administration of pharmaceutically acceptable salts of the disclosed compounds as well as the unneutralized compounds themselves.

The compounds of this invention may be administered alone or in combination with other pharmacologically-active ingredients. Whether singly or in combination, they may be used in compositions for oral administration combined, if desired, with extenders or carriers which are relatively non-toxic or inert. On the other hand, they may be administered in liquid form as a suspension or solution in a suitable vehicle for parenteral use.

The invention will be better understood with reference to the following examples. It is understood, however, that the examples are intended for illustration only and it is not intended that the invention be limited thereby.

EXAMPLE 1

P–1905 p-Anisaldehyde 68.1 g. (0.5 mole), 2-methyl-2-oxazoline 85.2 g. (1.0 mole) and sodium bisulfate 2 g. were mixed with 125 ml. of xylene in a 500 ml. round-bottom flask connected with a 4-bulb Snyder column, water separator and reflux condenser. The mixture was allowed to react overnight with stirring. The mixture was then heated at a temperature of about 132–160° C. for about eight hours, and after cooling was filtered. The filtrate was distilled through a 15-inch Vigreux column. The fraction distilling at 124–132° at 0.1 mm. analyzed: carbon 64.96%; hydrogen 6.70%; nitrogen 6.76%. These values were in good agreement with calculated values for the proposed structure: carbon 65.12%, hydrogen 6.83%; and nitrogen 6.33%. This fraction was redistilled and the cut distilling at 128–130° at 0.08 mm. was taken as the pure product.

The nuclear magnetic resonance (NMR) spectrum and infra-red absorption spectrum were consistent with the proposed structure:

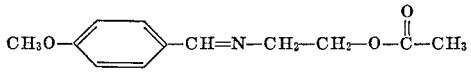

When administered orally to laboratory mice, the $LD_0$ was determined to be 1050 mg./kg. the $LD_{50}$ was 1975±160 and the $LD_{100}$ was 4200 mg./kg. A trained observer determined that animals receiving it were tranquilized.

EXAMPLE 2 p-Chlorobenzaldehyde 28.1 g. (0.2 mole) and 2-ethyl-2-oxazoline 20 0. g. (0.2 mole) were charged to a flask mixed and allowed to stand at room temperature for 22 days. The mixture was distilled through an 8 inch Vigreux column and the fraction distilling at 128° at 0.12 mm. to 136° at 0.3 mm. to 144° at 0.7 mm. was selected as the product. It analyzed: carbon 60.63%; hydrogen 6.09%; chlorine 14.67% and nitrogen 6.05%. These values were in good agreement with calculated values for the proposed structure: carbon 60.13%, hydrogen 5.89%; chlorine 14.79% and nitrogen 5.84%. The NMR spectrum was consistent with the proposed structure

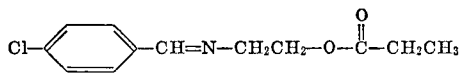

The $LD_0$ by oral administration to mice was 1150 mg./kg. The $LD_{50}$ was 2100±200 and the $LD_{100}$ was 2800 mg./kg. A trained observer determined that the animals receiving it were tranquilized.

EXAMPLE 3

The experiment of Example 1 was repeated in all essential details except that benzaldehyde 10.6 g. (0.1 mole) was reacted with 2-methyl-2-oxazoline 8.5 (0.1 mole), but without added sodium bisulfate catalyst, over a period of eleven days at room temperature. The mixture was distilled through an 8″ Vigreux column and the fraction distilling at 126–129° at 5 mm. was selected as the product. The NMR spectrum and the infra-red absorption spectrum were consistent with the proposed structure:

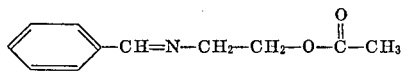

The compound analyzed as follows: carbon 68.21%; hydrogen 7.19%; nitrogen 7.51%. These values were in fair agreement with calculated values for the proposed structure: carbon 69.10%; hydrogen 6.85%; and nitrogen 7.33%. The unsaturated linkage was catalytically reduced and the ester group was hydrolyzed to yield a known compound, benzylaminoethanol, b.p. 156° (17 mm.). The picrate was prepared, m.p. 135–136° which agrees with published values, thus proving the proposed Schiff base structure.

The $LD_{50}$ by oral administration to mice was 2200±160 mg./kg. The $LD_0$ was 1700 mg./kg. and the $LD_{100}$ was about 2800. A trained observer determined that animals receiving the compound were tranquilized.

EXAMPLE 4

The experiment of Example 3 was repeated in all essential details except that the oxazoline used was 2-ethyl-2-oxazoline 10 g. (0.1 mole). The mixture was allowed to stand at room temperature, and after about six days, one drop of trifluoroacetic acid was added as a catalyst. After standing another 16 days, the mixture was distilled through an 8″ Vigreux column. The fraction distilling at 137–138° C. at 5 mm. was taken as the product. The NMR spectrum and infra-red spectrum were consistent with the structure:

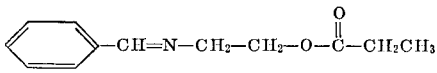

The compound analyzed as follows: carbon 71.56%; hydrogen 8.00%; nitrogen 7.11%. These values were in fair agreement with calculated values for the proposed structure: carbon 70.20%; hydrogen 7.36%; nitrogen 6.82%.

The product had an oral $LD_{50}$ of 2500±264 mg./kg. in mice. The $LD_0$ was 1150 mg./kg. and the $LD_{100}$ was 5000. A trained observer determined that animals receiving the compound were tranquilized.

EXAMPLE 5

The experiment of Example 4 was repeated in all essential details except that the oxazoline used was 2-ethyl-4-methyl-2-oxazoline and the trifluoroacetic acid was added on the seventh day. After standing an additional 16 days at room temperature, the mixture was distilled through an 8″ Vigreux column. The fraction distilling at 136–138° and 5 mm. was taken as the product. The NMR spectrum and infrared absorption spectrum were consistent with the structure:

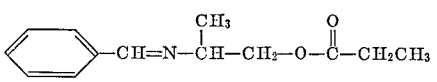

The product analyzed: C, 70.61%; H, 8.16; N, 6.58. Calculated values for the above structure is: C, 71.19%; H, 7.82; N, 6.39.

The product had a $LD_{50}$ by oral administration to white mice of approximately 3900 mg./kg. The $LD_0$ was 1700 mg./kg. and the $LD_{100}$ was greater than 5000 mg./kg. A trained observer determined that animals receiving the compound were tranquilized.

EXAMPLE 6

The experiment of Example 4 was repeated in all essential details except that the oxazoline was 2,4,4-trimethyl-2-oxazoline, 11.6 g. and the trifluoroacetic acid was added after about 2 days. After an additional 16 days, the crystals which had separated were dissolved by adding 25 ml. benzene and warming. The solution was then chilled for 3 days and the precipitate was separated by filtration and washed with benzene. The filtrate was distilled through an 8″ Vigreux column and the fraction distilling at 130–133° at 5 mm. was selected as the product. The NMR spectrum and infra-red absorption spectrum were consistent for a compound having the structure

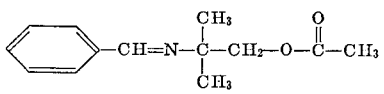

It analyzed: C, 70.35%; H, 7.65; and N, 6.68.

The $LD_{50}$ by oral administration to mice was 2560±313 mg./kg. The $LD_0$ was 1700 and the $LD_{100}$ was 5000 mg./kg. A trained observer determined that animals receiving the compound were tranquilized.

I claim:
1. Compounds corresponding to the formula

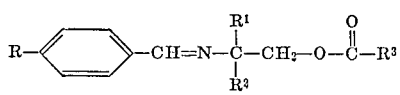

where R is hydrogen, chlorine or methoxy, $R^1$ and $R^2$ are hydrogen or methyl and are the same or different, and $R^3$ is methyl or ethyl.

2. The compounds of claim 1 wherein $R^1$ and $R^2$ are hydrogen.
3. The compounds of claim 1 wherein $R^1$ and $R^2$ are methyl.
4. The compounds of claim 1 wherein $R^1$ is methyl and $R^2$ is hydrogen.
5. The compounds of claim 1 wherein $R^3$ is methyl.
6. The compound of claim 1 wherein $R^3$ is ethyl.
7. The compound of claim 1 wherein R is hydrogen.
8. The compound of claim 1 wherein R is chlorine.
9. The compound of claim 1 wherein R is methoxy.
10. A process for the preparation of the compounds of the formula

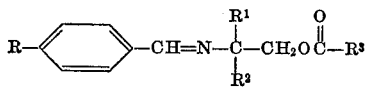

where R is hydrogen, chlorine or methoxy; $R^1$ and $R^2$ are hydrogen or methyl and are the same or different, and $R^3$ is methyl or ethyl comprising reacting in about a 1:1 mole ratio an aldehyde represented by the formula

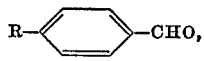

where R is hydrogen, chlorine or methoxy, with an oxazoline represented by the formula

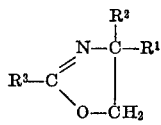

where $R^1$ and $R^2$ are hydrogen or methyl and are the same or different and $R^3$ is methyl or ethyl at a temperature of from about room temperature to about 160°, and recovering said compound.

11. The process of claim 10 wherein the reaction is effected in the presence of from about 0.05 to about 1.0% based on the weight of the reactants of an acid catalyst selected from the group consisting of mineral acids, benzene sulfonic acid, p-xylene sulfonic acid, p-toluene sulfonic acid, naphthalene sulfonic acid, formic acid and trifluoroacetic acid.

References Cited

Chem. Abstracts, 58:1551h.
Chem. Abstracts, 62:5751b.
Chem. Abstracts, 68:58639k.

VIVIAN GARNER, Primary Examiner

U.S. Cl. X.R.
424—311

PO-1050
(5/69)

UNITED STATES PATENT OFFICE
CERTIFICATE OF CORRECTION

Patent No. 3,839,422                    Dated October 1, 1974

Inventor(s) Herbert L. Wehrmeister

It is certified that error appears in the above-identified patent and that said Letters Patent are hereby corrected as shown below:

Column 1, line 48, that portion of the formula reading -CN=N- should read -CH=N-

Signed and sealed this 29th day of April 1975.

(SEAL)
Attest:

RUTH C. MASON
Attesting Officer

C. MARSHALL DANN
Commissioner of Patents
and Trademarks